(12) United States Patent
Yap (10) Patent No.: US 6,724,523 B2
(45) Date of Patent: Apr. 20, 2004

(54) REMOTELY LOCATABLE RF POWER AMPLIFICATION SYSTEM

(75) Inventor: Daniel Yap, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 106 days.

(21) Appl. No.: 10/116,854

(22) Filed: Apr. 5, 2002

(65) Prior Publication Data

US 2003/0090777 A1 May 15, 2003

Related U.S. Application Data

(60) Provisional application No. 60/332,368, filed on Nov. 15, 2001.

(51) Int. Cl.[7] ............................. H01S 3/00; H03F 21/00
(52) U.S. Cl. .............................................. 359/333; 330/3
(58) Field of Search ................................ 359/333, 349; 250/208.2; 343/843; 330/3, 4

(56) References Cited

U.S. PATENT DOCUMENTS

| | | | | |
|---|---|---|---|---|
| 4,028,702 A | * | 6/1977 | Levine .................. | 343/100 SA |
| 5,001,336 A | | 3/1991 | de la Chapelle ......... | 250/208.2 |
| 5,153,762 A | * | 10/1992 | Huber ........................ | 359/125 |
| 5,404,006 A | | 4/1995 | Schaffner et al. ........ | 250/208.2 |
| 5,930,031 A | | 7/1999 | Zhou et al. .................. | 359/344 |
| 6,188,808 B1 | | 2/2001 | Zhou et al. ...................... | 385/3 |

OTHER PUBLICATIONS

Deckman, B., et al., "A 5–Watt, 37–GHz Monolithic Grid Amplifier", *IEEE MTT–S Digest*, paper WE2D–3, pp. 805–808 (2000).

Ingram, D.L., et al., "Compact W–Band Solid–State MMIC High Power Sources", *IEEE MTT–S Digest*, paper WE4A–4, pp. 955–958 (2000).

Escalera, N., et al., "Ka–Band, 30 Watts Solid State Power Amplifier", *IEEE MTT–S Digest*, paper TU1F–42, pp. 561–563 (2000).

Goldsmith, C., et al., "Principles and Performance of Traveling–Wave Photodetector Arrays", *IEEE Transactions on Microwave Theory and Techniques*, vol. 45, No. 8, pp. 1342–1350 (1997).

Murthy, S., et al., "A Novel Monolithic Distributed Traveling–Wave Photodetector with Parallel Optical Feed", *IEEE Photonics Technology Letters*, vol. 12, No. 6, pp. 681–683 (2000).

Shimizu, N., et al., "InP–InGaAs Uni–Traveling–Carrier Photodiode With Improved 3–dB Bandwidth of Over 150 GHz", *IEEE Photonics Technology Letters*, vol. 10, No. 3, pp. 412–414 (1998).

Kato, K., "Ultrawide–Band/High–Frequency Photodetectors", *IEEE Transactions on Microwave Theory and Techniques*, vol. 47, No. 7, pp. 1265–1281 (1999).

Liu, T., et al., "InP–Based DHBT with 90% Power–Added Efficiency and 1 W Output Power at 2 GHz", *Solid–State Electronics*, vol. 41, No. 10, pp. 1681–1686 (1997).

Schäffer, C.G., "Application of Optical Amplifiers in a Microwave Distribution Network for Phased Array Antennas," *Lasers and Electro–Optics Society Annual Meeting, 1995, 8th Annual Meeting Conference Proceedings*, vol. 1, pp. 202–203 (Oct. 30–31, 1995).

* cited by examiner

*Primary Examiner*—Mark Hellner
(74) *Attorney, Agent, or Firm*—Ladas & Parry (57) ABSTRACT

A RF amplification system which includes a RF modulation unit fed by an optical carrier and an RF input signal, the modulation unit modulating the RF input signal onto the optical carrier to produce a modulated RF optical signal; an array of optical amplifiers coupled to the modulation unit for receiving and amplifying the modulated RF optical signals; and a detecting unit having at least one photodetector coupled to the array of optical amplifiers for receiving and detecting the modulated RF optical signals, the at least one photodetector producing an amplified RF output in response thereto.

36 Claims, 6 Drawing Sheets

PRIOR ART

REMOTELY LOCATABLE RF POWER AMPLIFICATION SYSTEM

CROSS REFERENCE TO RELATED APPLICATIONS

This application claims the benefit of U.S. provisional application No. 60/332,368 filed Nov. 15, 2001 for an "Remotely Locatable RF Power Amplification System" by Daniel Yap, the disclosure of which is hereby incorporated herein by reference.

TECHNICAL FIELD

A high-power RF amplification system for an antenna transmitter using optical components which permit the amplifying components that consume power and generate heat to be remotely located away from the RF load, which is at the antenna element. The amplification is performed by a set of optical fiber amplifiers arranged in parallel, with the amplified RF signal produced by electrically combining the outputs of a corresponding set of photodetectors.

BACKGROUND OF THE INVENTION

For moderately narrow-band signals at high frequencies, an optical means, dual line lasers, can be added to achieve frequency conversion using the same set of photodetectors. Thus, a signal at baseband or intermediate frequency can be supplied to the amplification system, which produces a signal translated up to the band required for transmission from an antenna.

In addition, optical wavelength multiplexing can be used to combine or select the multiple optical-fiber amplifier channels. This permits the use of a single optical intensity modulator to transduce the RF input signal for the multiple optical fiber amplifiers, resulting in higher net RF gain from the amplification system.

Many RF antenna systems in the future will include electronically scanned phased arrays. Such antennas contain a large number (hundreds or thousands) of emitting or driven elements. Each of these driven elements requires a RF power amplifier of moderate power appropriate for the signal to be transmitted. For example, a 100-watt antenna composing of 500 driven elements requires an output of 200 mW per element. Typically, the power amplifiers are located at or near the antenna elements. This co-location of the amplifier at the antenna element is especially necessary for high-frequency antennas, which operate at RF frequencies from 30 to 90 Ghz, for example. Although amplifiers with large bandwidth and excellent power-added efficiency (PAE) are available for lower frequencies, <20 GHz, high PAE and large bandwidth is difficult to achieve at the higher frequencies. For an exemplary 100-watt antenna, an additional 200 or more watts of excess power must be dissipated at the antenna aperture even for amplifiers with a PAE of >20%. This additional heat removal task further increases the bulk of the phased array antenna and also limits the flexibility of its design. The present invention provides a way to locate the amplifier, and its associated excess heat generation, remotely, away from antenna elements. The remote locating is accomplished by means of optical fibers, which have high immunity to electromagnetic interference (EMI) and which do not produce EMI.

Figure 1:
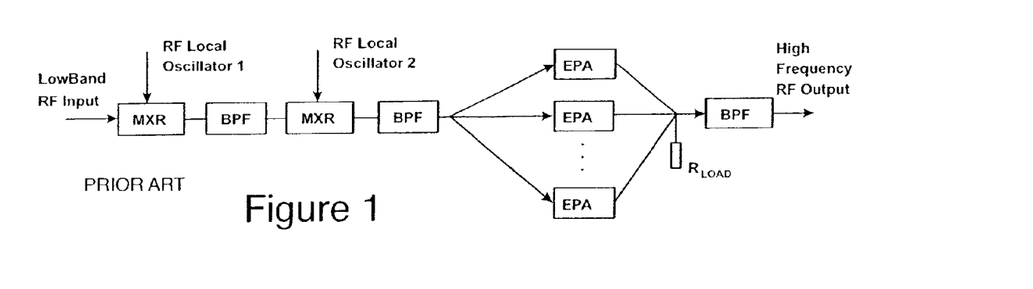
FIG. 1 is a schematic diagram of a prior art approach for a RF power amplification and frequency conversion system.

A prior approach to realizing a high-frequency RF antenna transmitter is illustrated in FIG. 1. This approach is especially applicable to frequencies of 30 GHz and higher since it becomes increasingly difficult to obtain low-loss RF cables at such frequencies. According to this prior art approach, a low-band signal and one or more local-oscillator (LO) signals (two LO signals are shown in FIG. 1) are generated at units that can be remotely located from the driven elements of the antenna (not shown). Generally, several frequency conversion stages are used if a very high frequency signal is to be transmitted by the antenna. This multi-stage frequency conversion approach permits the frequencies of the LO signals to be lower. The frequency converters, such as a mixer (MXR), RF filters (BPFs) and RF electronic power amplifiers (EPAs) are located at the phased-array antenna elements.

In order to achieve the high output powers needed for a RF antenna transmitter, multiple electronic power amplifiers (EPA), connected in parallel, are typically used. One way to combine multiple RF amplifiers that are located at some, but only a moderate, distance from the load is to configure the amplifiers themselves as a RF antenna and then radiate the RF signal as a free-space electromagnetic wave to the load. See, for example, 2000 IEEE MTT-S Digest, paper WE2D-3, pp. 805–808. An output power of 5 watts was achieved at 37 GHz using an array of 512 transistor amplifiers. This use of free-space radiation between the amplifier and the load limits flexibility in the placement of the amplifier and load. Also, effects such as scattering of the radiated RF energy could be the cause of undesirable EMI.

Another way is to use a RF waveguide to combine the outputs of multiple transistor amplifiers. The combiner is fairly small, only a couple inches in length. A RF waveguide could be used to remote the load, but the loss of such waveguides is quite high, especially at the higher frequencies, and such waveguides can be quite bulky. Delivery of 2.2 watts power at W-band with 9.9% PAE using 8 MMIC-amplifier channels was reported in 2000 IEEE MTT-S Digest, paper WE4A-4, pp. 955–958. As expected, better performance was achieved at the lower frequencies. For example, 30 watts power at 31 GHz with a PAE of 20%, using a 3-stage configuration with 8 parallel output amplifiers was reported in 2000 IEEE MTT-S Digest, paper TU1F-42, pp. 561–563.

Given the smaller wavelength associated with these high frequencies and the desires to make the antenna lighter and to have a reduced radar cross section, there is a need to move (or remote) the power consuming and heat generating components away from the phased-array antenna elements. The present invention provides a way to locate remotely the RF power amplifiers and to eliminate the frequency converting mixers, which are the major power consumption and heat generation components at the antenna.

BRIEF DESCRIPTION OF THE PRESENT INVENTION

The approach of the present invention makes use of optical fiber amplifiers rather than electronic (transistor) amplifiers commonly used in the prior art. Also, the amplified signals are delivered to the load by means of optical fiber, rather than through free-space EM-wave propagation or by means of RF waveguides or RF cables. The heat generating portions of the amplifiers can be, and are preferably, located at a distance, perhaps many meters to hundreds of meters, away from the antenna and its driven elements. Multiple photodetecting devices are preferably used as transducers that convert the multiple amplified RF-modulated lightwave signals into multiple RF signals. The electrical outputs of the photodetecting devices are combined preferably at or near the driven elements. Electronic frequency converters (typically mixers) used in the prior art at the antenna are no longer needed since their function is performed by photodetecting devices.

The present invention achieves a high RF power output by adapting several prior approaches for combining multiple photodetectors. These prior approaches are described in more detail below and the distinctions between these prior approaches and the approaches of this invention are discussed below. The key distinguishing feature of the present invention, nevertheless, is the remotely located optical-fiber amplifiers and not the combination of photodetectors. The phrase "remotely located" is used herein to indicate that the heat generating sources associated with the optical-fiber amplification components can be located sufficiently distant from the antenna itself so that the heat generated by the heat generating sources does not impact antenna design considerations in any substantial way.

DETAILED DESCRIPTION

Figure 2:
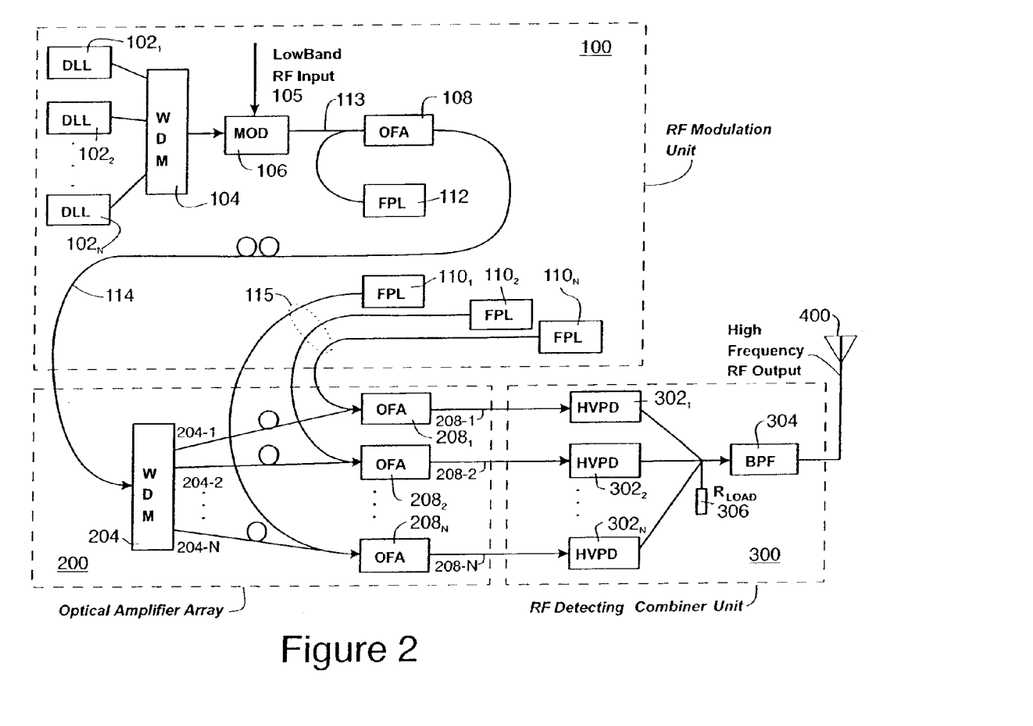
FIG. 2 is a schematic diagram of one embodiment of a remotely located RF power amplification system.

One embodiment of the present invention is illustrated by FIG. 2. The invention, in terms of this embodiment, can be divided into three major blocks. A first block 100 is a RF modulation unit that applies the low-band (baseband or IF) RF signal onto a lightwave carrier. This block also supplies the pump laser light for the optical fiber amplifiers. A second block 200 is an optical amplifier array. In the case of this invention, those amplifiers are optical-fiber amplifiers rather than electronic (transistor) amplifiers. A third block 300 is a RF detecting combiner unit. This block detects the up-converted RF signal and combines the multiple amplified outputs into a single load. Only the third block needs to be located at the antenna elements. Most of the excess power generation, and dissipation, occurs in the first block 100. The second block 200 consists entirely of lightwave components (rather than electronic components) which could be located fairly close to the antenna (say within several hundred meters from it) but does not need to be located directly at the antenna. This first block can be located much further away form the antenna elements—for example, block 100 could be located thousands of meters away from the zantenna elements.

The first block 100 contains multiple dual-line lasers (DLL) $102_1$, $102_2$, ... $102_N$, each of which has a different wavelength pair ($\lambda_{1\text{-}1}$, $\lambda_{1\text{-}2}$, $\lambda_{2\text{-}1}$, $\lambda_{2\text{-}2}$, ... $\lambda_{N\text{-}1}$, $\lambda_{N\text{-}2}$) associated therewith.

An optical-wavelength division multiplexer (WDM) 104 in block 100 is used as an optical combiner to combine the outputs of the lasers $102_1$, $102_2$, ... $102_N$ onto a common output which is applied to an optical intensity modulator (MOD) 106, and then, optionally, to an optical fiber amplifier (OFA) 108. The optical intensity modulator 106 also receives an electrical RF input signal 105. Block 100 also preferably contains multiple fiber-pump lasers (FPL) 110. The FPLs tend to be sources of heat and are preferably remotely located from the RE detecting and combiner elements in block 300. The FPLs could be associated instead (or together with) the elements of the optical amplifier array of block 200 so long as the elements of block 200 are remotely located from the elements of block 300.

The RF input signal 105, which is preferably at low-band frequencies, generally between 1 kHz and 5 GHz, is supplied as an electrical input to the optical intensity modulator 106. The lightwave carrier for the modulator 106 is supplied from the WDM combiner 104. This lightwave carrier is comprised of multiple pairs of optical frequency tones. Each pair of tones, e.g. $\lambda_{1\text{-}1}$ and $\lambda_{1\text{-}2}$, is supplied from a separate dual-line laser 102. The optional optical fiber amplifier 108, if utilized, provides some initial gain for the RF-modulated lightwave signal on fiber 113 by making use of its associated FPL 112 which transmits its laser light on fiber 116. Amplifier 108 can be used to overcome losses from the WDM 104's combining and splitting functions and also propagation losses in the optical-fiber cable 114 which may be significant if the RF modulation unit 100 is separated from the optical amplifier array 200 by some distance (perhaps many kilometers). FPL 112 is used to pump the optical-fiber gain media in the optical fiber amplifier 108 and FPLs 110 pump the optical-fiber gain media in the optical fiber amplifiers 208 in the second block 200 via fibers 115. These FPLs 110, 112 emit light at a very different wavelength from the RF-modulated lightwave carrier. Light from the FPLs 110, 112 is carried to the various OFAs 108, 208 usually by means of optical fibers 115 and 116. Thus, the first block 100 is connected to the second block 200 preferably only via optical fibers 114 and 115.

Figure 3:
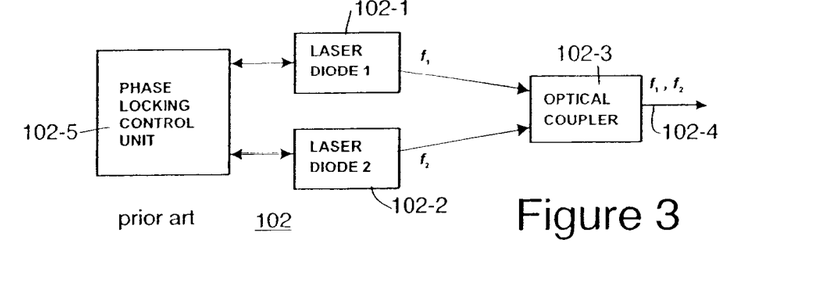
FIG. 3 is a schematic diagram of a multiple, dual-line laser.

The DLLs 102 generate dual-tone lightwave inputs to WDM 104. One possible implementation of a DLL 102 is illustrated in FIG. 3, an implementation known per se in the prior art. This laser 102 is comprised of a pair of single-tone, or single-wavelength, lasers 102-1 and 102-2 that preferably would be provided by distributed feedback (DFB) laser diodes. Single-tone laser 102-1 typically is operated so that it emits light of a different wavelength from the other single tone laser 102-2. The dual-line laser unit 102 also contains an optical combiner or coupler 102-3 that combines the lightwave outputs of both lasers 102-1 and 102-2 onto a single optical fiber 102-4.

The dual-line laser unit 102 also contains a phase locking control unit 102-5 to phase-lock the two lasers to each other. The dual-line laser unit 102 is the lightwave source for an optical heterodyning approach to frequency-convert (or translate) the low-band RF input signal 105 into a high-frequency signal that is to be transmitted by the antenna element.

With optical heterodyning, the optical outputs of two lasers 102-1 and 102-2 at different wavelengths are combined onto a photodetector. In a simple case, the two lasers each produces a single wavelength, that is, a single spectral line. When their combined output is converted by a photodetector into an electronic signal (the photocurrent), that electronic signal has frequency components at the sum and difference of these two laser lines. This occurs because the photodetector current is proportional to the incident optical power (or the square of the electric-field of the incident light). The sum frequency is a very high, optical frequency. The difference frequency is typically in the RF range and is output from the photodetector as a current or voltage. In order for the heterodyne output to be produced, the two laser lines must be locked together, so that their phase fluctuations are coherent. Various methods known in the art can be employed to achieve this locking. The two laser lines can be supplied to an optical intensity modulator, with a typical modulator being a Mach-Zehnder interferometer. A RF input signal is also supplied to the modulator, which applies an intensity modulation onto the lightwave signal. The transfer function of the modulator results in the generation of additional frequency sum and difference terms. The output of the photodetector is then another RF signal containing frequency components that are the sum (for up conversion) and difference (for down conversion) between the frequencies of the RF input and the frequency spacing between the two laser lines. In essence, the frequency difference of the two laser lines acts as a local-oscillator (LO) frequency that is multiplied with the input signal (at a baseband or intermediate frequency, IF) to produce the up-converted RF signal. Typically, the photodetector also can be used with some electronic bandpass filtering so that only the desired output frequencies are selected.

Each of the DLLs 102 emits light at two tones characterized by their optical frequencies $f_{n-1}$ and $f_{n-2}$ or their wavelengths $\lambda_{n-1}$ and $\lambda_{n-2}$. The frequency difference, $f_{n-1}-f_{n-2}$, of these two tones is equal to the desired LO frequency for the up-converted RF signal. Each of the DLLs 102 preferably emits light having different wavelengths from every other DLL in the plurality of DLLs in block 100. A typical spacing between a pair of tones is 50–400 GHz. This spacing should be several times greater than the spacing of the two tones (which equals the LO frequency) of a pair of tones emitted by a DLL 102. The total number of tone pairs that may be combined and the full wavelength range that may be realized depends on the wavelength coverage of the WDM combiner 104 and the gain bandwidth of the optional optical fiber amplifier 108. This bandwidth can exceed 5,000 GHz.

The majority of the power consumption and heat generation of the RF amplification system occurs in the dual-line laser 102 units and in the fiber-pump lasers 110. Since all of these units are located in the RF modulation unit 100, which can be located at some great distance away from the antenna elements, the necessary power supply and heat dissipation units can be provided at a more convenient location than at the antenna element itself. For example, these functions could be performed in the core body of an airplane or satellite or in the main housing of a wireless-communication base station.

The second block 200 of the RF power amplification system is the optical amplifier array. This block 200 has multiple optical inputs and outputs, as shown in FIG. 2. The optical inputs, typically in the form of optical fibers, are supplied from the MOD 106 (perhaps via an optional OFA 108) and the FPLs 110 of the first block 100. The second block 200 preferably contains multiple optical fiber amplifiers (OFA) 208 and also a second WDM 204 that is operated as an optical-wavelength selective splitter. This block 200 may contain a large number of OFAs 208, with quantities between four and one hundred OFAs being typical. The WDM 204 selects, according to their wavelength, a set of dual-tone RF-modulated lightwave carriers for each of its outputs 204-1 through 204-N. Each pair of tones at each output 204-1 through 204-N corresponds to the pair of tones generated by each DLL $102_1$ through $102_N$, respectively. That dual-tone RF-modulated carrier at each output 204-1 through 204-N is then supplied to an associated OFA 208. The N OFAs $208_1$ through $208_N$ have corresponding outputs 208-1 through 208-N at which an amplified signal appears. Each OFA $208_1$ through $208_N$ receives two optical inputs, an optical pump signal from an associated FPL $110_1$ through $110_N$ and the dual-tone RF modulated carrier from WDM 204, for amplification in the amplification medium of the amplifier. For example, if the amplification medium of an OFA 208 is a length of erbium-doped optical fiber, the associated FPL 110 would be at an appropriate wavelength to excite the gain material of the amplification medium into its higher energy state. The optical outputs 208-1 through 208-N of the various OFAs $208_1$ through $208_N$ form the outputs of this second block 200 and are supplied to various photodetecting devices in the third block 300.

The third block 300 of the RF power amplification system is a RF detecting combiner unit. This unit comprises (i) multiple photodetecting devices, which are preferably high-voltage photodetecting devices (HVPD) $302_1$ through $302_N$, (ii) a RF load 306 and (iii) a band-pass filter (BPF) 304. The function of a photodetector (the HVPDs 302 in this embodiment) and a band-pass filter (element 304 in this embodiment) in the performance of optical heterodyning has already been described above. In the first embodiment shown in FIG. 2, the electrical outputs of the multiple HVPDs 302 are connected, in parallel, onto the same RF load 306. Thus, the currents from those HVPDs 302 are summed at the load 306. This means that the RF voltage that must be supported by each of the HVPDs 302 would be due to the summed value of the currents. Also, the effective capacitance of the group of HVPDs $302_1$ through $302_N$ is the sum of their individual capacitances. The BPF 304 and load 306 are shown in FIG. 2 as distinct elements only for illustrative purposes. The frequency band-pass function of filter 304 can be incorporated into the design of the load 306 if desired. The output of the BPF 304 is then delivered to an antenna system 400. The phase delay of the RF lines connecting the multiple HVPDs $302_1$ through $302_N$ to their common load 306 are preferably adjusted so that the currents supplied from those multiple HVPDs to the load are in phase with each other and thereby sum constructively. The lengths of the lines can be controlled and/or optional phase delays elements can be utilized to achieve this goal.

In some applications, the HVPDs $302_1$ through $302_N$ may not be able to cope with the voltage excursions which would be experienced due to the currents involved in summing N outputs from the N HVPDs $302_1$ through $302_N$. In such an event, the HVPDs 302 can be grouped using techniques that will be discussed with reference to FIGS. 8 and 9, for example, such that each HVPD 302 sees a voltage excursion with which it can cope and which is less than that which would be experienced by connecting all HVPDs 302 to a common load 306 as shown in FIG. 2. In FIG. 2 the number N reflects (i) the number of DLLs 102 utilized, the number of outputs on the WDM 204, the number of OFAs 208 utilized and the number of HVPDs 302 utilized. The frequency pair from a particular DLL $102_X$ will be associated with a similar subscripted OFA $208_X$ and a similar subscripted HVPD $302_X$ as well as a related output 204-X of the WDM 204.

Figure 4:
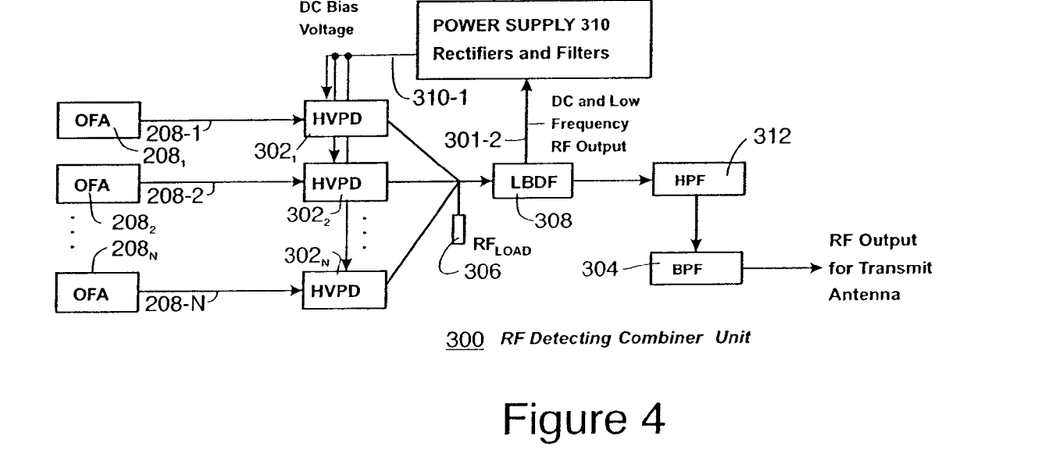
FIG. 4 is schematic diagram of a self-power supply for a RF detecting combiner.

The electrical output of the HVPD 302 that results from the optical heterodyning has frequency components at DC, and at the low-band frequency of the input RF signal, as well as at the higher frequencies associated with the frequency conversion process. In a typical application, the low-band frequency component may be at 1 GHz and the effective LO frequency at 38 or 60 GHz. The low-band frequency component can be rectified and filtered and combined with the DC component to serve as a power supply 310 for the photodetecting devices 302, as illustrated by FIG. 4. A frequency-selective RF power splitter 308, such as a known directional filter circuit (LBDF), may be used to separate the low-band and DC components from the higher frequency components. The low-band and DC components are fed via path 310-2 to the power supply to supply them with power. The power supply includes conventional rectifier and filters to produce DC at its output 310-1. This reuse of the low-frequency photodetected energy to provide a power supply 310 improves the power efficiency of the system and is one aspect of the present invention. The higher frequency components are at the effective LO frequency as well as at the sum and difference of the LO and the low-band input frequency. An optional high-pass filter (HPF) 312 selects only those higher frequency components. One or more of those components are then selected by the bandpass filter (BPF) 304 to be transmitted through the antenna system 400.

The reason one can combine the outputs of multiple HVPDs 302 in the manner shown in FIG. 2 is that the optical output power of a single-optical-mode optical-fiber amplifier 208 is currently well below the maximum optical input power that a HVPD 302 can handle. A typical optical fiber amplifier 208 can produce an optical output of several tens of milliwatts and has a gain of approximately 25 dB. Assuming that an optical-fiber-coupled HVPD 302 has a responsivity of 0.5 amps/watt, and its associated OFA 208 has an output of 20 mW, the photodetected current is 10 mA. This photocurrent and its photocurrent-induced voltage are much lower than the levels that the HVPD 302 can handle. In order to take advantage of the voltage-handling capability of the HVPD 302, this embodiment of the present invention combines the outputs of multiple HVPDs 302 onto the same load 306 where their photocurrents are summed. Multiple HVPDs 302 can be connected directly together until the voltage due to their combined photocurrents reaches a limit imposed by constraints for linear performance. As an example, if it is assumed that a single HVPD 302 has a 1-dB compression point at an output voltage of 2 volts (given a 50-ohm load), the combined photocurrent is 40 mA at the 1-dB compression. Thus, four HVPDs 302 could be connected together. A similar limitation applies for the combined capacitance of multiple HVPDs 302 and their effect on the RC time constant, which eventually could limit the frequency response bandwidth.

There are several possible ways to combine the outputs of multiple photodetectors 302 that are fed by multiple optical fibers connected to outputs 208-1 . . . 208-N. One way is to place the photodetectors 302 as nodes in a RF traveling-wave transmission line, following an idea described in a patent by Schaffner, et al. (See U.S. Pat. No. 5,404,006). This approach was demonstrated in hybrid form as described by Goldsmith, et al. in IEEE Transactions on Microwave Theory and Techniques, vol. 45, pp. 1342–1350 (1997). A monolithic implementation of this approach, by Ming Wu of UCLA and others, is described in IEEE Photonics Technology Letters, vol. 12, pp. 681–683 (2000). An illustration of the transmission-line-combined photodetectors is given in FIG. 5. Note that in this prior art realization, light is supplied originally from a single optical fiber 502. Multiple branches are made from that input fiber, with each branch supplying a fraction of the input light to a separate photodetector 504. The multiple photodetectors are used in the prior art because the light intensity supplied by the input fiber 502 is too high for any one photodetector 504 to accommodate. Thus, those multiple low-optical-power photodetectors 504 can be considered a single high-optical-power distributed photodetector, as the authors called them. In contrast, the present disclosure considers each of the multiple photodetecting devices 302 as a separate high-optical-power, high-voltage detector. They are fed from multiple fibers (generally associated with separate optical-fiber amplifiers 208) rather than from multiple branches of a single fiber as is done in the prior art.

Figure 5:
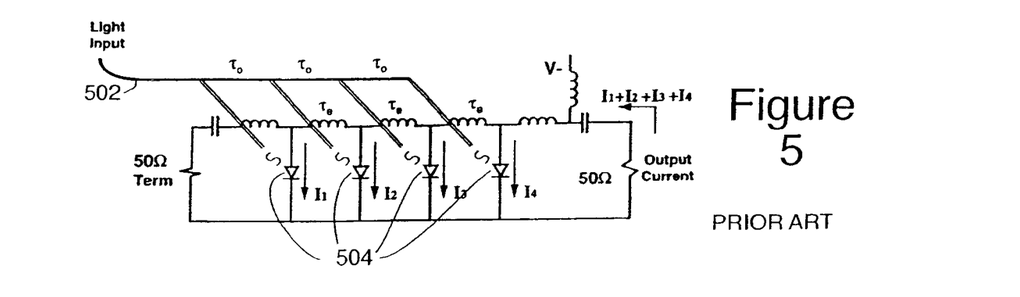
FIG. 5 is an illustration of a prior art distributed photodetector combined through a transmission line.

The combination of photodetectors by means of a traveling-wave transmission line has some advantages. By using the transmission-line interconnection, each photodetector is affected only by its own capacitance and its own photocurrent. Thus, the optical input power can be increased, by adding more photodetectors, without sacrificing the frequency response bandwidth. It should be noted, however, that the transmission-line combination approach also results in an excess 3 dB loss since the output of each photodetector is sent in two directions, both toward the load and away from the load. Only the signal directed toward the load is used and adds coherently with the outputs of the other photodetectors. A termination resistor to prevent unwanted reflections in the transmission line, which could limit the frequency response bandwidth, absorbs the signal that is directed away from the load.

The preferred approach of the present invention is to divide the photodetecting devices 302 into groups or sets. For photodetecting devices within a set, their overall spacing is small compared to the RF wavelength. Thus, within a photodetecting set, the device outputs can be combined directly, simply by using wires, as an example. Direct connection of the electrical outputs of multiple photodetectors has been described in a patent by de la Chapelle (See U.S. Pat. No. 5,001,336). The photocurrents from the multiple photodetectors are summed. This connection technique means that the current output from any one photodetector is loaded down by the depletion capacitance of the other photodetectors, to which that photodetector is connected. Thus, there is a practical limit to how many photodetectors can be connected together and yet achieve a given frequency bandwidth.

The present amplifier system makes direct connections between the outputs of multiple photodetecting devices 302, similar to the de la Chapelle approach. However, there are several distinctions between the present disclosure and the de la Chapelle approach. The disclosed Remotely Locatable RF Amplification System makes use of a new high-voltage photodetecting device (HVPD) that permits linear operation at high optical input powers, an issue not addressed in the de la Chapelle patent. Furthermore, the context for the de la Chapelle patent is an antenna receiver, or a receiver that combines multiple antenna outputs. A low-noise electronic amplifier (LNA) is preferably located at each receive antenna source. The output of each LNA is then used to modulate separate lightwave carriers, which are carried to the photodetectors. In this prior work, it would not have been advisable to use optical-fiber amplifiers to achieve the amplification since the OFAs have a high noise figure and are high-power amplifiers. The OFAs are suitable for the presently disclosed Remotely Locatable RF Amplification System since it concerns an antenna transmitter (and not an antenna receiver).

Another constraint needs to be addressed in order to combine the HVPD 302 outputs directly. The multiple HVPDs should be located close together, in comparison to the up-converted RF wavelength. For example, a 100 GHz signal has a wavelength that is on the order of 1 mm, depending on the dielectric constant of the substrate material on which the multiple HVPDs and load are mounted. Optical fibers can be spaced as close as 0.125 mm apart. Thus, several HVPDs could be connected together. Note that these HVPDs also could be arranged more compactly in such a way that the optical fibers arrive from several edges of the substrate piece on which those devices are located. The lengths of each RF line or wiring that connect each of the HVPDs 302 to an associated load 306 are preferably chosen to equalize the phases of the signals from the HVPDs 302 to the load 306. These lengths are preferably shorter than the wavelength of the up-converted RF signal.

The high-voltage photodetecting device (HVPD) is an important element of the presently disclosed embodiment of the present invention. This device permits the direct combining of the photodetected output currents. The possibility of direct combination exists because the HVPD is capable of maintaining linear performance at much higher RF voltages, which result from the combined photodetected currents. In order to achieve a linear transfer function for the optical-to-electrical transduction process of prior art, conventional photodetectors, the photodetector RF voltage is kept at a low value to avoid space-charge effects that would degrade the frequency response. Thus, in the prior art, when high signal frequencies must be photodetected, the photodetectors are typically combined by means of a transmission line, as described above with reference to FIG. 5. By placing the photodetectors in a transmission line, their output currents can be summed although each photodetector senses only its own output voltage and the effects of its own photocurrent.

The specifications for a HVPD are described in more detail in the following paragraphs, to distinguish a HVPD from a conventional photodetector. Two key functions that are performed by a photodetecting device are (i) the generation of carriers, as a result of the light absorption, and (ii) the sweep-out of those photo-generated holes and electrons, to different ends of the device in order to produce the output photocurrent. In conventional photodetectors, the carrier sweep-out region is the same as the carrier generation (light absorption) region. Also, typically both electrons and holes are generated in a depleted region and move by a drift mechanism within this region to the edges of the region where those carriers recombine with oppositely charged carriers and yield the photocurrent output. This region is kept thin, in order to also achieve high-frequency performance. In order to achieve linear performance, the electric field in the carrier sweep-out region of the photodetector must be high so that the carrier velocity is maintained. The non-linear performance occurs because electrical carriers produced as a result of the absorbed light produce internal electric fields that counteract the applied electric field, generally as a result of space-charge effects. The reduced electric field results in a reduced velocity of the carriers, especially of the holes, and thus reduced current. The higher the incident optical power, the more the number of carriers produced to counteract the applied field and the greater the reduction of current (which causes a departure from linearity). A higher electric field could be applied to counteract the space charge effects. However, the applied electric field must be kept below the value that would produce electrical breakdown in the region at lower optical power. Thus, the acceptable voltage across that region has a limited range, at lower values by the need to maintain the carrier velocity and at the higher values by the need to avoid electrical breakdown.

HVPDs 302 are different. One possible implementation of a HVPD 302 is a recently developed uni-travelling-carrier (UTC) photodiode that has separate carrier generation and carrier sweep-out regions. This device was developed by NTT and one version of the device is described in IEEE Photonics Technology Letters, vol. 10, pp. 412–414 (1998). An advantage of this device is that, rather than having both holes and electrons as the current defining carriers, the current defining carriers of the UTC photodiode are only electrons. Electrons have a higher velocity than holes, and thus the frequency response is improved. Note that those electrons move by a diffusion mechanism, because the light-absorption region is doped p-type. An advantage of some UTC photodiode designs is that fairly high voltages can be sustained without electrical breakdown, even for devices with frequency bandwidths exceeding 100 GHz. The improved performance of a UTC photodiode compared to a more conventional PIN photodetector is discussed by Kato in IEEE Transactions on Microwave Theory and Techniques, vol. 47, pp. 1265–1281 (1999). A single-device, electrical output power of 144 mW has been reported. A reverse-bias voltage of 4 volts was applied to that device. In contrast, a reverse bias voltage of approximately 1–2 volts is used typically for wideband photodetectors that have a conventional PIN design.

Although the aforedescribed UTC photodiode is a preferred implementation of the HVPD 302 of this invention, other photodetecting devices could be used as well. One example is operating a dual-heterojunction bipolar transistor (DHBT) as a light absorber, or even as a phototransistor. A DHBT that could be used in this manner is described by Liu et al. in "InP-based DHBT with 90% power-added efficiency and 1 W output power at 2 GHz," Solid-State Electronics, v. 41, no. 10, pp. 1681–1686 (1997). Such a DHBT has a p-type InGaAs base layer that can act as the light-absorbing region and an n-type InP collector layer that can act as the carrier sweep-out region. The collectors of multiple DHBTs can be connected together to a common load. The main constraint on the photodetecting device is that it have sufficiently linearity, i.e. that it can maintain sufficient frequency bandwidth and sustain the voltage obtained for the combined photocurrents.

Figure 6A:
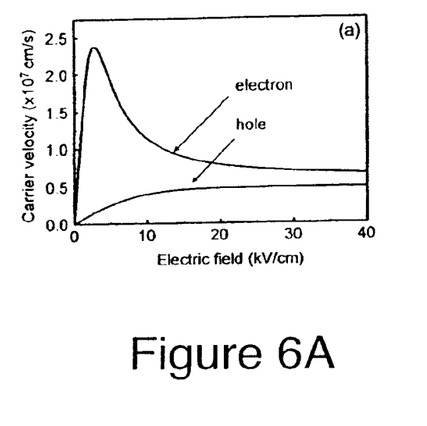
FIGS. 6A and 6B are graphs of calculated electric-field dependence of carrier velocity and diffusion coefficient, respectively.
Figure 6B:
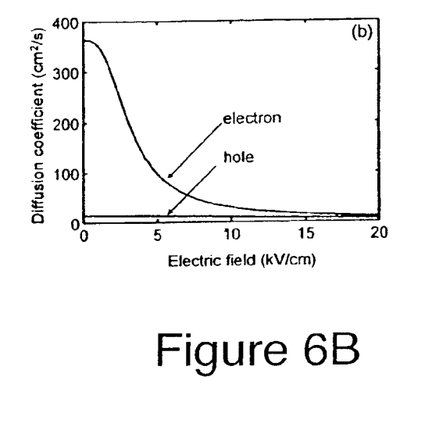
Figure 7A:
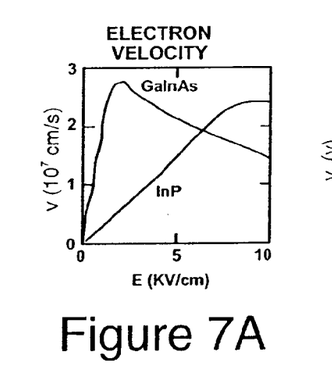
FIGS. 7A and 7B are graphs of calculated electron velocities for InGaAs and InP as well as breakdown voltages for InP, respectively.
Figure 7B:
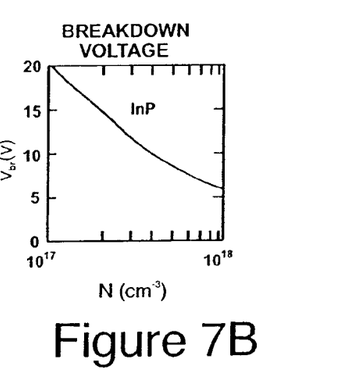

An examination of the carrier velocities and diffusion coefficients of the photo-generated holes and electrons should clarify for the reader how a HVPD achieves both high frequency and high RF voltage operation. These parameters are plotted in FIGS. 6A and 6B versus the electric field. A HVPD can operate by the diffusion of electrons across an InGaAs light-absorbing region and by the drift of electrons across an InP sweep-out region. Thus, it is desirable to have fairly low electric fields in the electron diffusion region, to maintain a high diffusion coefficient. The electron transport in the light-absorbing region can be enhanced further. For example, in some designs of the UTC photodiode, such as the design described in the above Photonics Technology Letters paper, a background electric field is established in the light absorption region to achieve a combined drift and diffusion of the electrons, which improves the frequency bandwidth. The electrons move primarily by drift in the carrier sweep-out region, which typically is comprised of InP. A fairly high electric field is needed in order to achieve high electron velocity in this material, as shown in FIG. 7A. FIG. 7A compares the electron velocities in InGaAs and in InP. The need for a higher electric field in the InP region is not a problem, since the breakdown voltage of InP is quite high, as is shown by FIG. 7B. Thus, the HVPD has a smaller, but significant, voltage drop across its GaInAs light-absorption region and a much larger voltage drop across its InP carrier sweep-out region.

In contrast to a HVPD, the drift velocity of holes limits the performance of a conventional photodetector having, for example, a PIN diode structure. See FIGS. 6A and 6B. Thus, the change in the hole velocity arising from the space-charge effect at high optical generation levels results in a departure from linearity. Note that for electric fields above 1 kV/cm, the electron velocity changes by only a factor of two to three as the electric field is changed. On the other hand, the hole velocity can change by a much greater percentage, especially at the lower fields, as seen from FIG. 6A. Thus to achieve good linearity in a conventional photodetector, a high electric field, typically above 10 kV/cm, is needed across the light absorption and carrier sweep-out region. This high electric field, however, must be sustained in the narrow-bandgap InGaAs material, which has a much lower breakdown voltage, typically a factor of three lower than InP.

Figure 8:
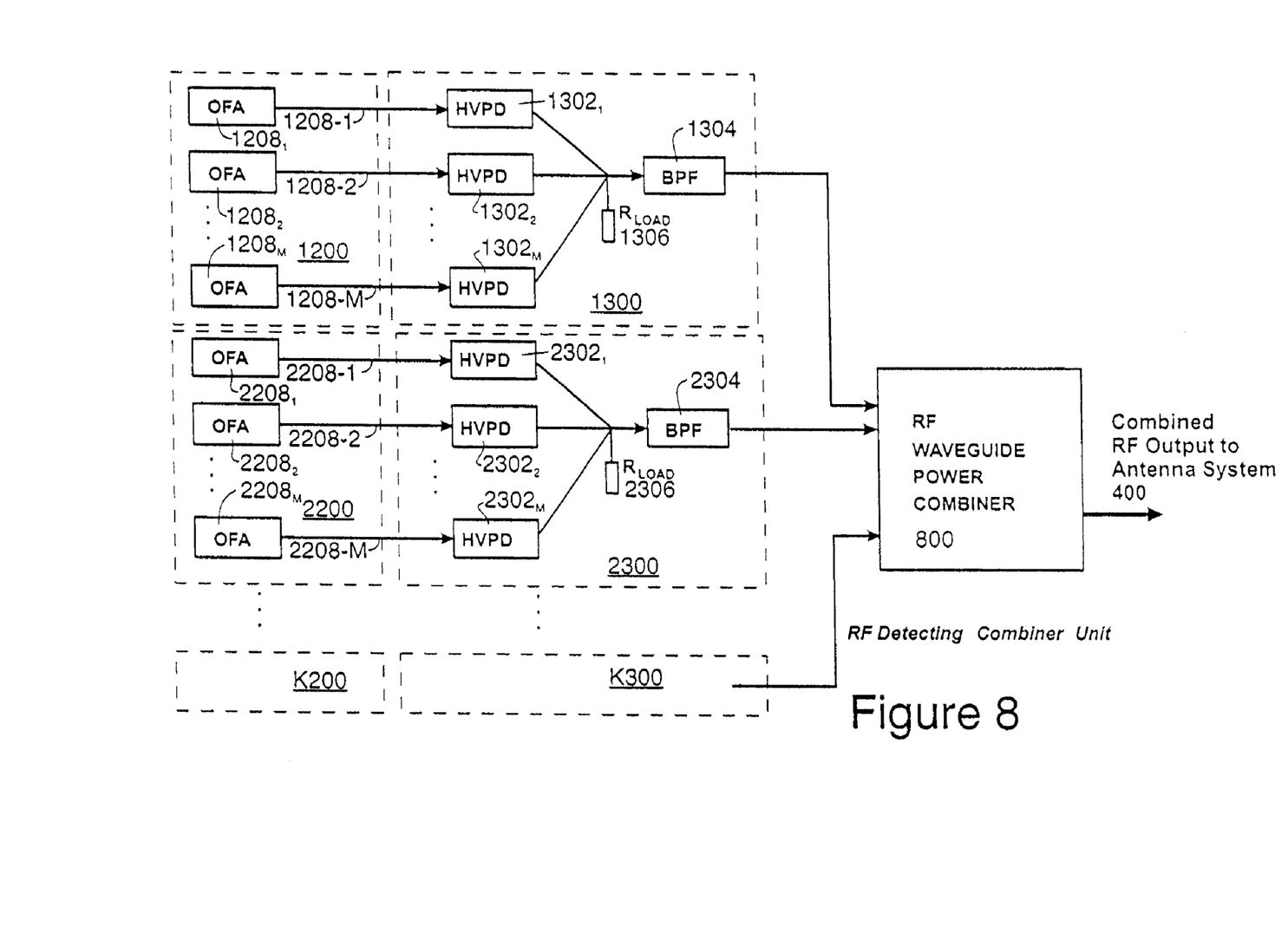
FIG. 8 is a schematic diagram of a RF detecting combiner unit that combines together multiple sets of HVPDs.

Each group of HVPDs 302 that can be combined in the manner described above (without degrading their linear performance too much) may be considered as a set. If even higher RF power must be delivered to the antenna system 400, multiple sets of HVPDs 302 can be combined together, as illustrated, for example, in FIG. 8. In FIG. 8 either a numeral '1' or a numeral '2' proceeds the three-numeral element numbers used for OFAs 208, HVPDs 302 and BPFs 304 to indicate whether they are associated with a first set '1' or a second set '2'. Of course, the number of sets utilized can be varied as needed, and, indeed, in FIG. 8 a total of 'K' sets is envisioned by the addition of the numeral or letter 'K' before the numerals 200 and 300 to represent a Kth set having an optical amplifier array 200 (see K200) and a RF detecting combiner 300 (see K300). Conventional RF techniques, such as those employed for MMIC power amplifiers could be used to accomplish this combining of the outputs from each block 300 (labeled as blocks 1300, 2300 . . . K300 depending upon the set with which it is associated). An example of a low-loss RF combiner 800 is a "magic-T" waveguide configuration.

Each set preferably has M OFAs associated with it. While is it is not necessary that each set have the same number of OFAs associated with it, making the design symmetrical in this respect (so that each set has the same number of OFAs) simplifies matters for the designer. Recall from the embodiment of FIG. 2 that there were N HVPDs in that embodiment tied to a single load 306. If too many HVPDs are so connected, the previously discussed linearity problems arise. By arranging the OFAs in sets, the number of HVPDs (and more importantly the voltage excursions experienced by them) are reduced. Generally speaking, N≈K·M. Indeed, N might equal K·M exactly, but that is not a necessary condition. Rather, it is a desirable design objective.

The multiple sets of HVPDs 302 also can be combined by means of a RF transmission line (similar to the Schaffner et al. approach for a distributed photodetector). In such an embodiment, each HVPD set would be located at a node of the transmission line. The choice of whether to use a distributed or a branched architecture to achieve the RF combination would depend on issues such as the comparative losses of those approaches, the ease of building frequency band-pass filtering into the combiner, and the number of sets of HVPDs 302 being combined.

Figure 9:
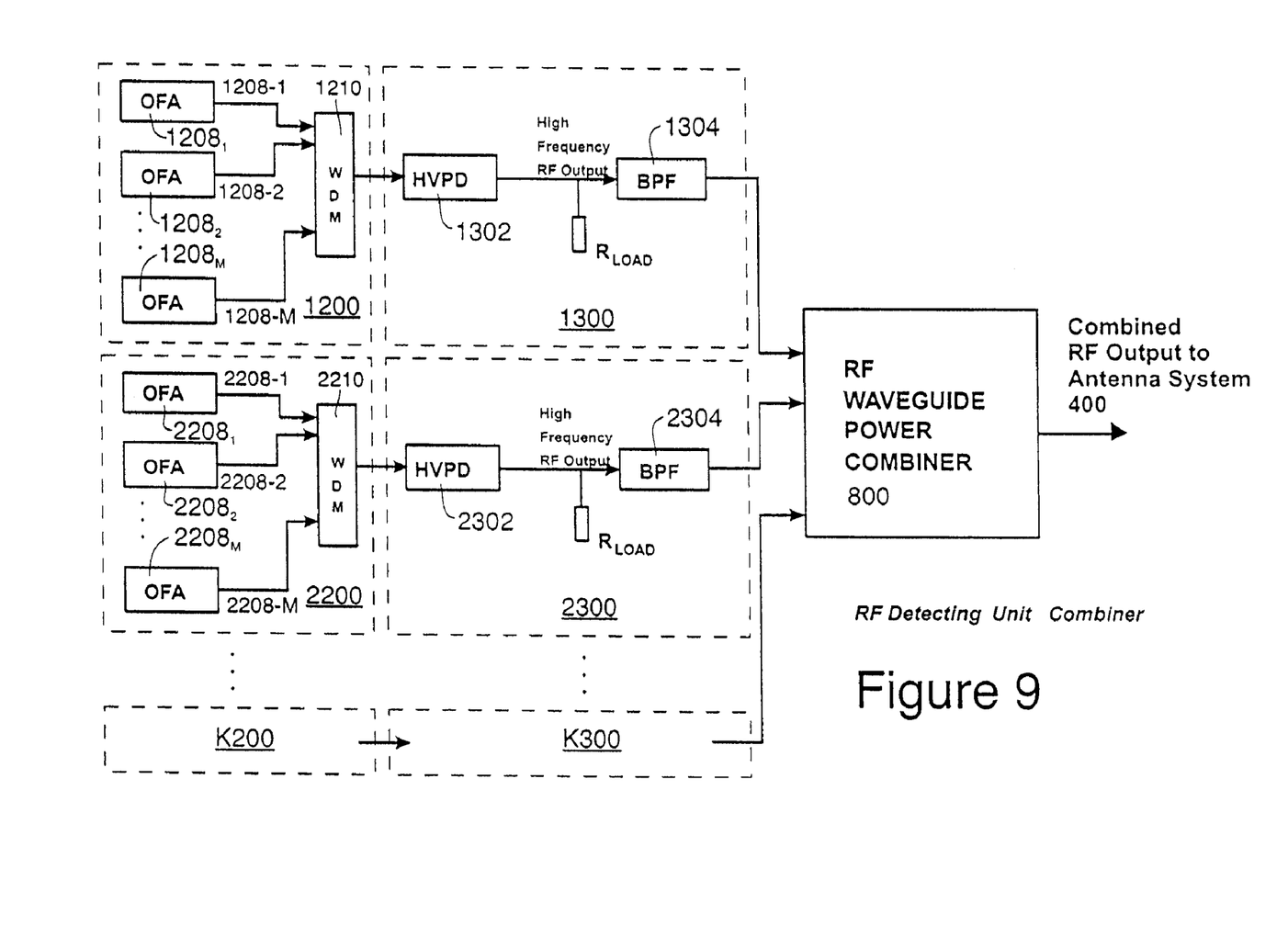
FIG. 9 is a schematic diagram of another alternate RF detecting combiner that includes optical-wavelength combiners.

Another way to detect and combine the outputs of the multiple OFAs 208 is illustrated in FIG. 9. This approach uses optical WDM combiners 1210, 2210 . . . K210 (the latter WDM K210 is not specifically shown in FIG. 9) to combine the outputs of several OFAs 208 onto a single optical fiber and supply that combined subset of OFA power to a single HVPD. The numbering convention used in FIG. 9 is similar to that used for FIG. 8. That is, in the case of a four digit reference numeral, the first digit represents the set number and the next three numerals represent the element number as used throughout this specification. If a dash or a subscript follows a four digit numeral, the number or letter appear as a subscript or after the dash reflects the fact that a block can have multiple similar devices. The letter 'K' is used to reflect any integer value greater than 2, and again N preferably equals K·M. The length of the optical fibers connecting OFAs $208_1$ through $208_M$ in a single set to the WDM 210 in the same set are preferably adjusted so that the RF signals modulated on the dual line lightwave carriers carried by those fibers are in phase relative to each other when detected by the HVPD 302 in the same set.

As illustrated in FIG. 9, each HVPD set is comprised of a single HVPD 1302, 2302 . . . K302 (the latter HVPD K302 is not specifically shown in FIG. 9). The outputs of multiple HVPD sets are then combined by means of RF power combiner 800. Those skilled in the art will now appreciate the fact that various combinations of the approaches described with reference to FIGS. 8 and 9 can be used. For example, assume that the outputs of four OFAs are to be combined in a HVPD set. That HVPD set could consist of a 4:1 WDM combiner and a single photodetecting device, as illustrated in FIG. 9. Alternatively, that HVPD set could consist of no (i.e. zero) WDM combiner and four photodetecting devices, as illustrated in FIG. 8. That HVPD set also could consist of two 2:1 WDM combiners and two photodetecting devices, an embodiment combining elements from the embodiments of FIGS. 8 and 9. This choice will be based on issues such as the capacitances of the photodetecting devices, the added optical insertion loss of the WDM combiner, and the desired frequency bandwidth. But, generally speaking, maximizing the number of OFAs per HVPD improves efficiency since the electronic combiner 800 then has fewer inputs.

Figure 10:
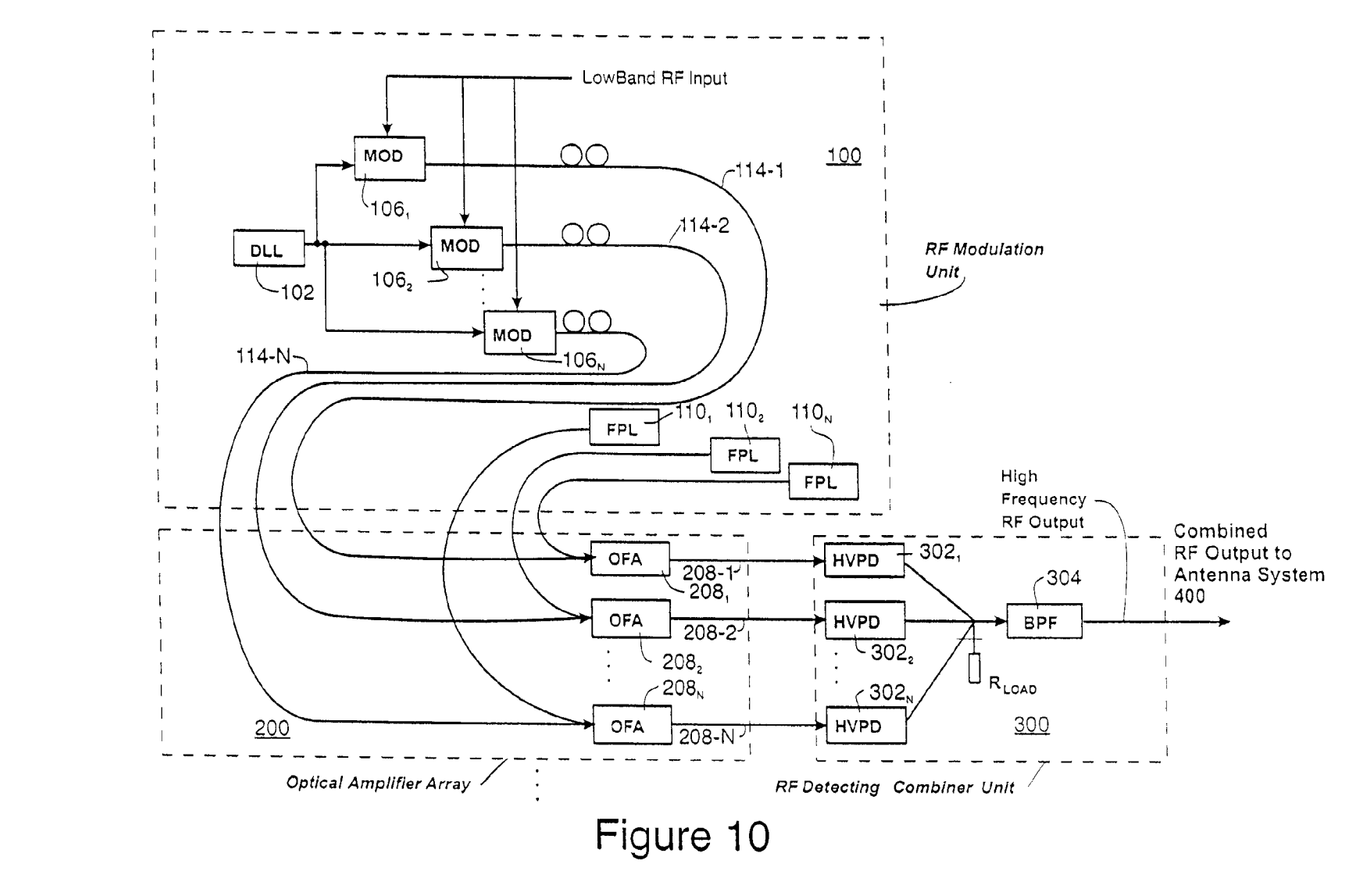
FIG. 10 is another alternative embodiment of the RF power amplification system.

An alternative embodiment of the RF power amplification system is illustrated in FIG. 10. This embodiment is less preferred because it generally has lower RF efficiency (and hence a lower gain). It makes use of the same RF detecting combiner unit 300 as the embodiment shown in FIG. 2 and the alternative embodiments shown in FIGS. 4, 8 and 9. The primary difference between the embodiments of FIG. 2 (and its closely related embodiments of FIGS. 4, 8, and 9) and 10 is that the RF input signal is split and used to modulate multiple optical intensity modulators $106_1$, $106_2$, . . . $106_N$ rather than a single optical intensity modulator 106. The embodiment of FIG. 10 is given as another illustration of the many possible configurations that the RF modulation unit 100 can take. In the embodiment shown in FIG. 10, a single dual-line laser unit 102 supplies the lightwave carrier for multiple optical intensity modulators $106_1$, $106_2$, . . . $106_N$. These modulators are fed from the same RF signal source. The RF-modulated lightwave output from each modulator is then carried to its associated optical-fiber amplifier by means of an associated optical fiber 114-1, 114-2, . . . 114-N. It also is possible to use multiple DLLs 102, with one or more modulators 106 associated with each DLL 102. Yet another possible embodiment would utilize a single dual-line laser unit 102 and a single modulator 106 followed by an optical splitter splitting the output of such single modulator 106 into the multiple optical-fiber amplifiers $208_1$, $208_2$, . . . $208_N$.

Furthermore, it is possible to combine the approaches of both FIGS. 2 and 10. For example, the optical and RF power splitting approach of FIG. 10 could be used for a small number of HVPDs 302 within a set and the optical-wavelength multiplexing of FIG. 2 could be used to address a large number of sets of HVPDs 302.

For some antenna applications, such as those involving somewhat lower transmitted frequencies, the high-frequency RF signal to be transmitted by the antenna can be modulated directly onto the lightwave carrier. There would be no need to accomplish the frequency conversion by the optical heterodyning approach. In these cases, single-line lasers could be used instead of the dual-line laser units. The optical intensity modulator may then need to be a higher frequency device. Note that the approach of FIG. 4 for a self-powered RF detecting combiner still could be used, with the DC component of the photocurrent assisting to sustain the bias voltage for the photodetecting device 302.

Yet another issue should be considered when multiple RF amplifiers are arranged in parallel and combined. It is desirable to match the RF phase delays undergone in the multiple parallel paths. For the embodiments of FIGS. 2 and 10, the parallel paths could involve long lengths of optical fiber, as well as some length of RF line. The lengths of those paths should be matched to a fraction of the RF wavelength in order to ensure that the RF power is delivered efficiently. Thus, it may be necessary to introduce a variable amount of phase delay in the various paths and then utilize a closed loop feedback path to adjust the phase delays in the various optical fibers to maximize the amount of RF power being delivered.

A number of embodiments of the invention have been disclosed and further modification will now suggest itself to those skilled in the art. As such, the invention is not to be limited to the disclosed embodiments excepts as specifically required by the following claims.

What is claimed is:

1. A RF amplification system comprising:
    (a) a RF modulation unit fed by an optical carrier and a RF input signal, the modulation unit modulating the RF input signal onto the optical carrier to produce a modulated RF optical signal;
    (b) an array of optical amplifiers coupled to the modulation unit for receiving and amplifying the modulated RF optical signals; and
    (c) a detecting unit having at least one photodetector coupled to the array of optical amplifiers for receiving and detecting the modulated RF optical signals, the at least one photodetector producing an amplified RF output in response thereto.

2. The RF amplification system of claim 1 wherein the array of optical amplifiers are coupled to said modulation unit solely by means of an array of optical fiber cables, whereby the modulation unit may be located at a remote location relative to the location of the array of optical amplifiers.

3. The RF amplification system of claim 2 wherein the at least one photodetector is coupled by means of one or more fiber optic cables to the array of optical amplifiers whereby the detecting unit may be located at a remote location relative to the location of the RF modulation unit.

4. The RF amplification system of claim 1 wherein the array of optical amplifiers are optical fiber amplifiers.

5. The RF amplification system of claim 1 wherein the RF modulation unit includes a plurality of lasers for pumping the array of optical amplifiers.

6. The RF amplification system of claim 1 wherein the RF modulation unit includes:
    (i) a plurality of dual tone laser generators;
    (ii) an optical intensity modulator for receiving the RF input signal; and
    (iii) a wavelength division multiplexer coupled to said plurality of dual tone laser generators for combining the outputs thereof as an optical input to the optical intensity modulator, the optical intensity modulator modulating the output of the wavelength division multiplexer with the RF input signal, the optical intensity modulator having an output coupled to the array of optical amplifiers.

7. The RF amplification system of claim 6 wherein each of the dual tone laser generators in said plurality of dual tone laser generators emit light having different wavelengths from every other dual tone laser generator in said plurality of dual tone laser generators.

8. The RF amplification system of claim 6 wherein the array of optical amplifiers includes a second wavelength division multiplexer, the second wavelength division multiplexer being coupled to receive light from the RF modulation unit and splitting that light onto a plurality of outputs by wavelength, each output of the second wavelength division multiplexer corresponding to the dual tone laser signal produced by a given dual tone laser generator as subsequently modulated by the RF input signal.

9. The RF amplification system of claim 8 wherein the wavelengths of the plurality of dual tone laser generators are adapted to being combined by the first mentioned wavelength division multiplexer and being split by the second wavelength division multiplexer.

10. The RF amplification system of claim 9 wherein the array of optical amplifiers is coupled to a third wavelength division multiplexer, the third wavelength division multiplexer being coupled to receive light from the optical amplifiers and to combine the light from the optical amplifier onto a single output which is coupled to the at least one photodetector.

11. The RF amplification system of claim 10 wherein the third wavelength division multiplexer comprises a plurality of third wavelength division multiplexers and wherein the array of optical amplifiers are arranged in sets with each set of optical amplifiers being associated with a different one of said plurality of third wavelength division multiplexers.

12. The RF amplification system of claim 11 wherein each one of said third wavelength division multiplexers is connected to a different load.

13. The RF amplification system of claim 12 further including a set of bandpass filters each of which is coupled to an output of one of said third wavelength division multiplexers and a RF waveform power combiner connected to receive an output of each of said set of bandpass filters.

14. The RF amplification system of claim 8 wherein the at least one photodetector comprises a plurality of photodetectors arranged in a plurality of sets, with each photodetector in a given set being connected to a common load.

15. The RF amplification system of claim 14 further including a set of bandpass filters each of which is coupled to the common load associated with each set and a RF waveform power combiner connected to receive an output of each of said set of bandpass filters.

16. The RF amplification system of claim 1 further including an antenna system coupled to the at least one photodetector.

17. The RF amplification system of claim 16 wherein the antenna system is coupled to the at least one photodetector by means of at least one band pass filter.

18. A method of reusing power in an optically based power amplification system comprising the steps of:
 (a) photodecting, in a plurality of photodectors, optical outputs of a plurality of optical amplifiers, the outputs of the plurality of optical amplifiers each carrying modulated laser light, the photodectors each having a photodector output;
 (b) combining the outputs of the photodectors at a load to form a combined output signal;
 (c) separating the relatively lower frequency portions of the combined output signal from the relatively high frequency portions of the combined output signal;
 (d) generating DC power for the photodectors by converting the relatively lower frequency portions of the combined output signal to DC power; and
 (e) coupling the relatively high frequency portions of the combined output signal to a high frequency RF output of the power amplification system.

19. The method of claim 18 wherein step (a) includes heterodyning, in the plurality of photodectors, optical outputs of the plurality of optical amplifiers, the outputs of the optical amplifiers each carrying multi-tone modulated laser light.

20. The method of claim 18 further including:
 (f) generating a plurality of dual tone laser lines by a plurality of dual tone lasers;
 (g) modulating the dual tone laser lines with a RF input signal; and
 (h) supplying the modulated dual tone lines to said plurality of optical amplifiers.

21. The method of claim 20 further including:
 (i) combining the dual tone laser lines as a single optical signal before modulating the dual tone lines; and
 (j) separating the modulated dual tone lines onto a plurality of signal outputs of a wavelength division multiplexer, each output of the wavelength division multiplexer having a single pair of laser lines corresponding to the laser lines generated by one of said plurality of dual tone lasers.

22. A method of optically amplifying a RF signal comprising the steps of:
 (a) feeding an optical carrier comprising a plurality of dual tones and the RF signal to be amplified into a RF modulation unit, the modulation unit modulating the RF signal onto the optical carrier to produce a modulated RF optical signal;
 (b) optically amplifying the modulated RF optical signal by an array of optical amplifiers coupled to the modulation unit for receiving and amplifying the modulated RF optical signal; and
 (c) receiving and detecting the modulated RF optical signal in a detecting unit having at least one photodetector coupled to the array of optical amplifiers, the at least one photodetector producing an amplified RF output in response thereto.

23. The method of claim 22 wherein the array of optical amplifiers are coupled to said RF modulation unit solely by means of an array of optical fiber cables, whereby the modulation unit may be located at a remote location relative to the location of the array of optical amplifiers.

24. The method of claim 23 wherein the array of optical amplifiers are optical fiber amplifiers which are pumped by a plurality of lasers remotely located away from the detecting unit.

25. The method of claim 22 wherein the RF modulation unit includes a plurality of lasers for pumping the array of optical amplifiers, the plurality of lasers being remotely located away from the detecting unit.

26. The method of claim 22 wherein the RF modulation unit includes:
 (i) a plurality of dual tone laser generators;
 (ii) an optical intensity modulator for receiving the RF input signal; and
 (iii) a wavelength division multiplexer, coupled to said plurality of dual tone laser generators, combining the outputs thereof as an optical input to the optical intensity modulator, the optical intensity modulator modulating the output of the wavelength division multiplexer with the RF input signal, the optical intensity modulator having an output coupled to the array of optical amplifiers.

27. The method of claim 26 wherein each of the dual tone laser generators in said plurality of dual tone laser generators emit light having different wavelengths from every other dual tone laser generator in said plurality of dual tone laser generators.

28. The method of claim 26 wherein the array of optical amplifiers includes a second wavelength division multiplexer which receives light from the RF modulation unit and splits that light onto a plurality of outputs by wavelength, each output of the second wavelength division multiplexer corresponding to the dual tone laser signal produced by a given dual tone laser generator as subsequently modulated by the RF input signal.

29. The method of claim 28 wherein the array of optical amplifiers is coupled to a third wavelength division multiplexer, the third wavelength division multiplexer being coupled to receive light from the optical amplifiers and to combine the light from the optical amplifier onto a single output which is coupled to the at least one photodetector.

30. The method of claim 29 wherein the third wavelength division multiplexer comprises a plurality of third wavelength division multiplexers and wherein the array of optical amplifiers are arranged in sets with each set of optical amplifiers being associated with a different one of said plurality of third wavelength division multiplexers.

31. The method of claim 30 wherein each one of said third wavelength division multiplexers is connected to a different load.

32. The method of claim 30 further including a set of bandpass filters each of which is coupled to an output of one of said third wavelength division multiplexers and a RF waveform power combiner connected to receive an output of each of said set of bandpass filters.

33. The method of claim 28 wherein the at least one photodetector comprises a plurality of photodetectors arranged in a plurality of sets, with each photodetector in a given set being connected to a common load.

34. The method of claim 33 further including a set of bandpass filters each of which is coupled to the common load associated with each set and a RF waveform power combiner connected to receive an output of each of said set of bandpass filters.

35. The method of claim 22 further including an antenna system coupled to the at least one photodetector.

36. The method of claim 35 wherein the antenna system is coupled to the at least one photodetector by means of at least one band pass filter.

* * * * *